US007069301B2

(12) United States Patent
Jerbi et al.

(10) Patent No.: US 7,069,301 B2
(45) Date of Patent: Jun. 27, 2006

(54) METHOD AND APPARATUS FOR SENDING MESSAGES FROM AN MMS SYSTEM

(75) Inventors: Belhassen Jerbi, Kirchheim (DE); Josef Laumen, Hildesheim (DE); Andreas Schmidt, Braunschweig (DE); Markus Trauberg, Velchede (DE); Sabine Van Niekerk, Salzgitter (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/467,642

(22) PCT Filed: Feb. 7, 2002

(86) PCT No.: PCT/DE02/00239

§ 371 (c)(1),
(2), (4) Date: Aug. 7, 2003

(87) PCT Pub. No.: WO02/063838

PCT Pub. Date: Aug. 15, 2002

(65) Prior Publication Data

US 2004/0057403 A1    Mar. 25, 2004

(30) Foreign Application Priority Data

| Feb. 7, 2001 | (DE) | ............................... 101 05 797 |
| Feb. 8, 2001 | (DE) | ............................... 101 06 127 |
| Aug. 29, 2001 | (DE) | ............................... 101 42 270 |

(51) Int. Cl.
*G06F 15/16* (2006.01)
(52) U.S. Cl. ...................................... 709/206; 709/230
(58) Field of Classification Search ................ 709/204, 709/206, 207, 203, 230; 379/88.13, 88.14; 455/466
See application file for complete search history.

(56) References Cited

U.S. PATENT DOCUMENTS

| 5,946,629 | A | * | 8/1999 | Sawyer et al. | ............... 455/466 |
| 5,974,449 | A | * | 10/1999 | Chang et al. | ............... 709/206 |
| 6,233,318 | B1 | * | 5/2001 | Picard et al. | ............. 379/88.17 |
| 6,389,114 | B1 | * | 5/2002 | Dowens et al. | ................ 379/52 |
| 6,411,684 | B1 | * | 6/2002 | Cohn et al. | ............... 379/88.14 |
| 6,421,707 | B1 | * | 7/2002 | Miller et al. | ................. 709/206 |

(Continued)

FOREIGN PATENT DOCUMENTS

EP    1 047 243    10/2000

OTHER PUBLICATIONS

Mostafa, M.-E.; "MMS—the modern wireless solution for multimedia messaging" Personal, Indoor and Mobile Radio Communications, 2002. The 13th IEEE International Symposium on vol. 5, Sep. 15-18, 2002 pp. 2466-2472 vol. 5.*

(Continued)

*Primary Examiner*—Marc D. Thompson
(74) *Attorney, Agent, or Firm*—Bell, Boyd & Lloyd LLC (57) ABSTRACT

Methods and apparatus for sending an MMS-message, such as an e-mail, a fax and/or an SMS, from a first subscriber device in an MMS-enabled system to a second subscriber device. The MMS-message is converted before being forwarded to the second subscriber device, if the second subscriber device is not connected to an MMS-enabled system or cannot received MMS-messages. Also, an interface device converts and forwards the MMS-message to a subscriber device for specifying the message format.

20 Claims, 2 Drawing Sheets

U.S. PATENT DOCUMENTS

| | | | | |
|---|---|---|---|---|
| 6,483,899 B1* | 11/2002 | Agraharam et al. | 379/88.14 |
| 6,498,835 B1* | 12/2002 | Skladman et al. | 379/88.12 |
| 6,556,586 B1* | 4/2003 | Sipila | 370/469 |
| 6,621,892 B1* | 9/2003 | Banister et al. | 379/88.14 |
| 6,707,580 B1* | 3/2004 | Bloomfield | 358/402 |
| 6,735,621 B1* | 5/2004 | Yoakum et al. | 709/218 |
| 6,775,359 B1* | 8/2004 | Ron et al. | 379/88.14 |

OTHER PUBLICATIONS

Syed, A.K.; Mandal, M.K.; Zeineddine, A.A.; Rahime, F.F.; "An adaptive framework for multimedia messaging services over wireless networks and the Internet" IEEE CCECE 2003. Canadian Conference on vol. 2, May 4-7, 2003 pp. 865-870 vol. 2.*

3G TS 23.140 Version 4.1.0, Release 4: Third Generation Partnership Project: Technical Specification Group Terminals; Multimedia Messaging Service (MMS); Functional Description, Stage 2.

WAP-209-MMS-Encapsulation: Wireless Application Protocol; WAP Multimedia Messaging Service; Message Encapsulation; MMS Proposed SCD 1.0.

* cited by examiner

METHOD AND APPARATUS FOR SENDING MESSAGES FROM AN MMS SYSTEM

BACKGROUND

The present invention relates to methods and apparatus for sending messages from a MMS (multimedia messaging service) system, and in particular, for sending e-mails, fax, SMS, etc., from a subscriber device in the MMS system to a subscriber device in a further system.

Standards have been defined or proposed for the sending of messages between subscriber devices that are linked into an MMS (multimedia messaging service) network. According to these standards, the messages to be sent by a subscriber device are sent in a specified form and have predefined content categories. The proposed standards and the details relating to said standards are published in, for example, "3G TS 23.140 Version 4.1.0, Release 4; Third Generation Partnership Project; Technical Specification Group Terminals; Multimedia Messaging Service (MMS); Functional Description; Stage 2" and "WAP 209 MMS Encapsulation; Wireless Application Protocol; WAP Multimedia Messaging Service; Message Encapsulation; MMS Proposed SCD 1.0".

The content of such a message is, for example, an e-mail, a fax, a SMS (short message service) text message, a text file, a graphics file, an audio file, a video file or similar message. A subscriber device in this case is, for example, a WAP-enabled (wireless application protocol) mobile radio device or a UMTS mobile radio device. When a message is sent, the message is preceded by a header or header field that contains, for example, the information elements shown in Table 1 (see below) (excluding the information element as described below in accordance with the present disclosure).

In the case of this message transfer between the subscriber devices, however, it is assumed that both the sender-side subscriber device and the recipient-side subscriber device either belong to the same MMS network or that both devices are linked into different MMS networks. Therefore an exchange of messages can only occur if both subscriber devices are MMS-enabled and are linked into an MMS-enabled network or communication system.

The present disclosure, therefore, addresses the problem of providing a method for transferring a message from a MMS system and a device therefor, which method and device allow the message to be forwarded to a subscriber device that is outside a MMS system.

SUMMARY

According to a disclosed example, a method for sending an MMS message is disclosed. The method is used to send the MMS message from a first subscriber device in an MMS-enabled system to a second subscriber device. The method includes converting the MMS message and forwarding the converted message to the second subscriber device when the second subscriber device is at least one of not linked into an MMS-enabled system or not able to receive MMS messages.

According to another disclosed example, a method is provided for forwarding an MMS message, which includes at least one of an e-mail, a fax, and an SMS, from a first subscriber device in an MMS-enabled system to a second subscriber device. The method of forwarding uses an interface device of the MMS-enabled system. The method includes executing with the interface device at least one of the following depending on a condition result: checking whether the second subscriber device belongs to the MMS-enabled system, and forwarding the MMS message to the second subscriber device in the MMS-enabled system when the second subscriber belongs to the system; checking whether the second subscriber device belongs to at least one other MMS-enabled system, and forwarding the MMS message to the second subscriber device when the second-subscriber device belongs to the at least one other system; and checking whether the second subscriber device can be assigned to an e-mail system, and converting the MMS message into an e-mail format and forwarding the converted message to the second subscriber device when the second subscriber device can be assigned to the e-mail system.

According to yet another example, a subscriber device is provided for a communication system to send MMS messages to at least one other subscriber device. The device includes a control device of the subscriber device configured to generate at least one of information elements and header fields for the MMS message. The information elements or header fields designating a message format for the at least one other subscriber device.

According to yet another example, an interface device for a communication system is disclosed for forwarding an MMS message from a first subscriber device to a second subscriber device, the interface device including a control device configured to convert the MMS message corresponding to a first message format into a message corresponding to a second message format.

DETAILED DESCRIPTION OF THE PREFERRED EXAMPLES

Figure 1:
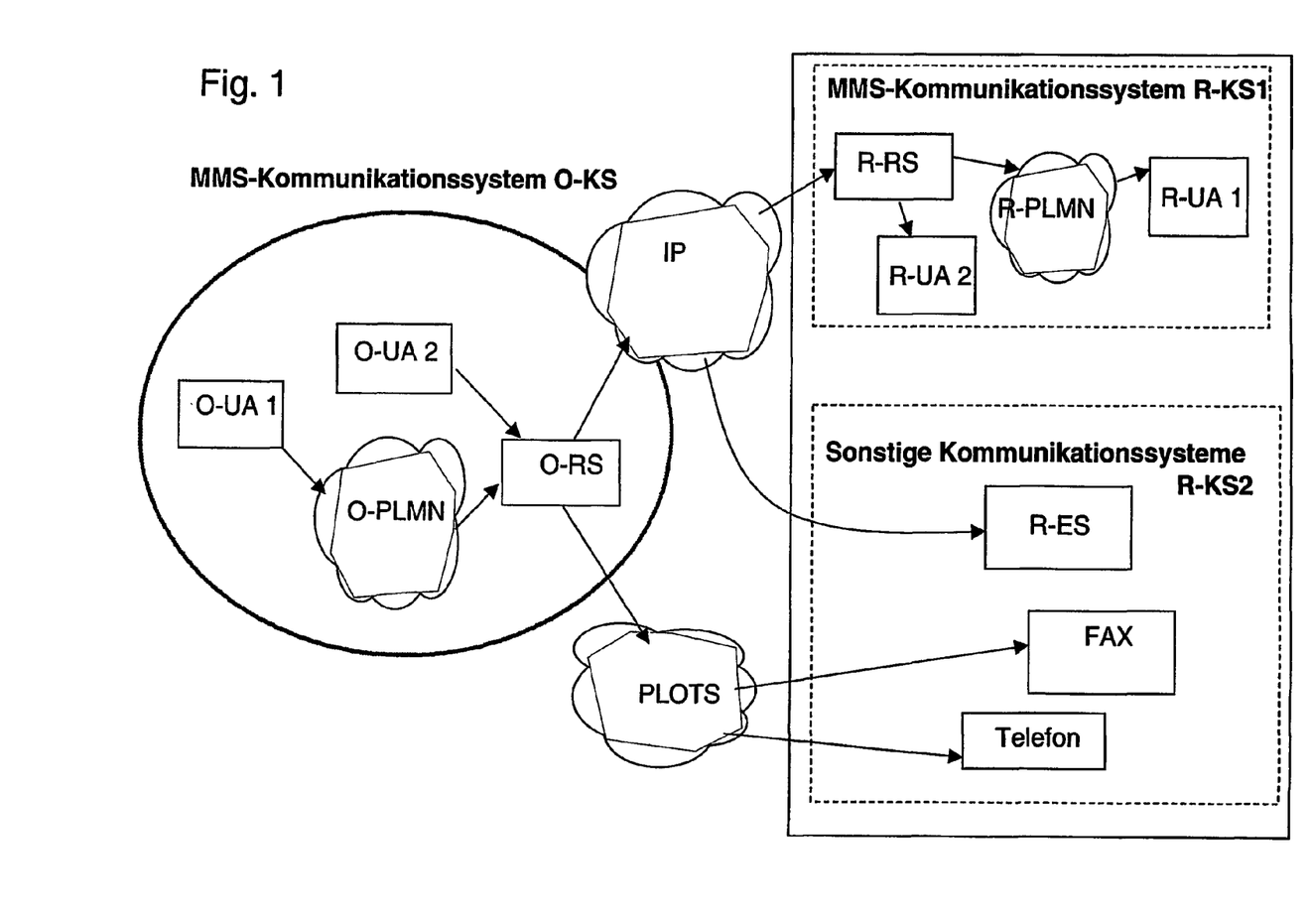
FIG. 1 illustrates a sender-side and a recipient-side communication system with various recipient-side receiving devices.

FIG. 1 shows a sender-side communication system O-KS, which operates in accordance with the MMS standard, and various recipient-side communication systems R-KS1, R-KS2. The communication systems allow a subscriber device or a terminal to send and receive messages. The arrows in FIG. 1 illustrate the case of a sender-side subscriber device O-UA1 or O-UA2 transmitting a message for a recipient-side subscriber device R-UA1, R-ES, fax or telephone.

Within the MMS communication system O-KS, each subscriber device O-UA1, O-UA2 is provided for creating an MMS message or transforming an MMS message for the user. The MMS communication system O-KS provides the service environment for the sender. In this way, the subscriber devices O-UA, R-UA and sender-side or recipient-side applications can be so-called MMS User Agents (UA) of the sender or recipient of a message. Examples for contents of MMS messages are e-mails, SMS (short message service), texts, graphics, voice mail, audio, video and similar messages, as specified in accordance with the MMS standard.

The message can be transferred in various ways from a subscriber device O-UA to an MMS relay/server O-RS or a network application of the sender. This is subsequently designated simply as server O-RS. In this case, the subscriber device O-UA1 is, for example, a mobile radio device such as a mobile phone, that forwards the MMS message via a mobile radio network O-PLMN of a network operator to the server O-RS of the sender. The subscriber device O-UA2 is connected to the server O-RS via a line. In this case, the connection between subscriber device O-UA2 and server O-RS can be provided by a fixed network, a network based on an Internet protocol, an intranet, a terminal connection or similar connection. The subscriber device O-UA2 can also be an application on a fixed network computer.

The message is forwarded from the server O-RS to a network operator of the recipient (communication system R-KS1, R-KS2) via an interim network IP (i.e., Internet). Additionally or alternatively, the message can be forwarded via a fixed network POTS (plain old telephone system), an intranet, a radio connection or similar. In this case, the fixed network POTS is, for example, the fixed network of Deutsche Telekom.

The recipient-side communication system R-KS1, R-KS2 represents a group of different communication systems in this case, each of which works on the basis of a different standard and, in accordance with the standard concerned, allows the receiving, sending and forwarding of messages having standard-specific contents. The communication system R-KS1, R-KS2 also includes an MMS-enabled communication system R-KS1, into which the messages from the sender-side communication system O-KS can be transferred directly via the Internet IP, in MMS format and without further conversion. An MMS relay/server R-RS (i.e., server R-RS) of the MMS communication system R-KS1 on the recipient side routes the MMS message, which was received from the Internet IP, via a line to a connected subscriber device R-UA2 or via a mobile radio network R-PLMN, into which the subscriber device R-UA1 is linked, to said subscriber device R-UA1. As in the case of the sender-side communication system O-KS, the subscriber devices R-UA are MMM user agents of the recipient, and the description relating to the subscriber devices O-UA and the server O-RS applies correspondingly to the connection between the subscriber devices R-UA and the server R-RS.

In addition to the MMS-enabled communication system R-KS1, the message can also be sent to the recipient via other communication systems R-KS2 (e.g., via an e-mail system R-ES of the recipient.) which the e-mail system can be reached via the Internet IP in the example of FIG. 1 via a fax device of the recipient, a telephone device of the recipient or similar. The fax device and the telephone can be reached via the fixed network POTS. A further subscriber device, not shown in FIG. 1, can receive SMS short messages, for example, but without being MMS-enabled. Such a subscriber device can be a mobile phone which is linked into the mobile radio network R-PLMN.

In order to direct the message to another communication system R-KS2, the relevant communication system R-KS1, R-KS2 can be specified by either the sender (sender-side subscriber device O-UA) or the server O-RS.

In an example, a sender sends a multimedia message MM to a recipient by means of a subscriber device O-UA of an MMS communication system O-KS, said message MM being first submitted to the server O-RS by the subscriber device O-UA. The server O-RS checks the message MM to ascertain, inter alia, whether the addressees or recipients of said message MM are known to the sender-side communication system O-KS (i.e., whether one or more addressees also belongs to the sender-side communication system O-KS).

In the case of addressees that are not subscriber devices O-UA of the sender-side communication system O-KS, the sender-side server O-RS checks whether one or more of these addresses can be identified as belonging to a second communication system that is known to the sender-side MMS communication system O-KS. The addressee or its subscriber device could belong to the MMS communication system R-KS1, for example.

In the case of addressees that neither belong to the sender-side communication system O-KS nor can be attributed to a second MMS communication system (R-KS1), which is known to the sender-side server O-RS, the MMS message MM is converted into an Internet e-mail by the server O-RS, and sent as an Internet e-mail via the Internet IP (e.g., to the subscriber device R-ES).

It is, therefore, specified in this example how the message reaches the recipient, if said recipient cannot be reached via an MMS communication system (O-KS, R-KS1). As described below with reference to FIG. 2, the sender receives a confirmation if required (see Table 1, supra), said confirmation indicating whether the message was received and forwarded by the server O-RS and whether the recipient received and/or opened the message. If it is also impossible to reach the recipient via e-mail (R-ES) in this case, the sender (subscriber device O-UA) receives a corresponding negative message.

In accordance with the present example, the messages MM cannot be forwarded to those recipients or subscriber devices that cannot be reached via an MMS communication system (O-KS, R-KS1) or e-mail (R-ES), but can only be reached via, for example, a fax device or SMS short messages.

In another example, the communication path is specified at least partly by a subscriber device O-UA or by its subscriber, in which case the recipient or the recipient-side subscriber device R-UA, R-ES, fax, telephone, SMS is addressed, for example, by means of an e-mail-like address or a telephone number. In this context, the recipient-side subscriber devices and their communication paths in FIG. 1 merely represent examples of the recipient-side devices.

The specification of the recipient-side subscriber device by the sender takes place if, for example, the recipient or the desired subscriber device of a message is temporarily or permanently unreachable via an MMS communication system O-KS, R-KS1 or if another communication channel is selected for reasons of security or similar. A further requirement arises if, for example, the recipient is to be addressed via various communication channels concurrently.

An information element or header field is provided for this purpose, allowing the sender of a message MM, when sending the message, to specify the message transfer system that is to be used by the sender-side MMS communication system O-KS for forwarding the MMS message to the recipient. In this case, it is beneficial if the specification by the sender corresponds to the device type of the terminal that is actually used by the recipient or of the actual subscriber device.

Depending on the type of the subscriber device of the recipient (e.g., MMS application O-UA, R-UA, Internet e-mail R-ES, telephone or), the message MM sent by the sender is converted by the sender-side server O-RS into a message format that is adapted to the recipient-side communication system R-KS2, and is then transmitted to the recipient system by means of transfer protocols that correspond to the recipient system. For example, a message MM that has to be transmitted to a fax machine is converted into a (virtual) image by the server O-RS, the image being sent to the fax device FAX of the recipient via a fax protocol. In exactly the same way, confirmation information (see below) of the MMS message MM is converted into confirmation requests that can be forwarded and/or processed by the recipient-side communication system R-KS2.

As part of the conversion, as many as possible of the control information items present in the sent message MM are analyzed by the server O-RS and transformed into control functions of the relevant recipient system. For example, the recipient addresses of the message MM are analyzed by the server O-RS and recognized as call numbers that are dialed by the fax protocol. These, and other information items of the message MM that are not transformed, can be made accessible to the recipient as contents of the converted message.

If, for example, a first recipient address having a fax device was specified as a subscriber device by means of "To: +495341xxxxxx", and a second recipient address having a fax device was specified as a subscriber device by means of "CC: +4989xxxxxx", a fax containing the converted message MM would be sent to each of the two fax devices. The information that the first recipient is the direct recipient ("To:"), while the second recipient merely receives a copy ("CC:"), is made known to the respective recipients in that the information items "To: +495341xxxxxx" and "CC: +4989xxxxxx" appear as additional text on the fax (e.g., in the form of a first fax page that contains the converted MMS information items as a protocol field or "header field" in the form of text or graphics).

In this case, the information element for specifying the transmission path and/or the recipient-side subscriber device can be provided either by defining one or more recipient addresses (when sending a copy) or by means of an additional, optional information element in the header of the MMS message MM. A code, for example, can be added to the recipient address, specifying the type of the subscriber device and/or the communication path. Alternatively, the server O-RS can infer the recipient-side subscriber device from the encoding of the recipient address, for example. If the address contains the component "@", for example, an Internet e-mail address (R-ES) can be inferred.

An additional, optional information element of the header of the MMS message can, for example, explicitly specify the type of the recipient-side subscriber device.

Table 1 shows in bold and italics how, for an MMS message header as disclosed, for example, in the document references cited above in background, a sender of a message MM specifies or defines an additional information element when sending this message MM to a sender-side server O-RS.

In a WAP implementation of the MMS service, an example of sending a message MM in text encoding can therefore appear as follows:

X-Mms-Message-Type: m-send-req
X-Mms-Transaction-ID: 123456789
X-Mms-Version: 1.0
To: +495341xxxxxx
From: josef.xxxxxx@mms-xxxxxx.de
X-MMS-Message-Class: Personal
Date: Fri, 07 Feb. 2001 09:58:19+0100
X-MMS-Expiry: Fri, 07 Feb. 2001 12:00:00+0100
X-MMS-Delivery-Time: Fri, 07 Feb. 2001 11:00:00+0100
X-Mms-Priority: High
X-MMS-Delivery-Report: Yes
X-MMS-Read-Reply: Yes
X-MMS-Sender-Visibility: Yes
Subject: Photo of lab layout
X-Mms-communication-means: Facsimile
Content-Type: text/plain;

Hi Marcus
Please send me the picture of our laboratory layout as soon as possible!
Regards
Josef XXXXXX In this example, "X-Mms-Message-Type: m-send-req" specifies this message as a message MM sent from a sender to a sender-side server RS, the message being assigned a transaction identification code "X-Mms-Transaction-ID: 123456789" by the subscriber device O-UA. This transaction identification code is used so that the send confirmation (see below) can be mapped onto this send event or acknowledged in the subscriber device O-UA. The version number "X-Mms-Version: 1.0" is required for purposes of backward compa The sender provides the details "To: +495341xxxxxx" and "From: josef.xxxxxx@mms-xxxxxx.de" to specify the recipient address (the telephone number of the recipient's fax device in this case) and the sender's own address (e.g., for replies). It is important here that the recipient is addressed by means of a telephone number in this example. However, the provision of a telephone number alone is not sufficient to identify uniquely the device type of the recipient, for a telephone number, which is not otherwise specified, could conceal, for example, a fixed-network telephone (that can only receive voice-based telephone calls),
a mobile radio device (that can receive e.g. SMS short messages and voice messages in a mailbox), or
even a fax device (that can only receive faxes).

In the above example, the message MM has been identified as a personal message MM ("X-MMS-Message-Class: Personal") and given a send time stamp ("Date: Fri, 07 Feb. 2001 09:58:19+0100"). The sender has specified a period of validity for this message MM by defining an expiry time for the message MM ("X-MMS-Expiry: Fri, 07 Feb 2001 12:00:00+0100"the forwarding/dispatch of the message MM ("X-MMS-Delivery-Time: Fri, 07 Feb. 2001 11:00:00+0100").

Since this message is considered important by the sender, the sender has allocated it a high priority ("X-Mms-Priority: High"). By adding "X-MMS-Delivery-Report: Yes", the sender is forcing an acknowledgm communication system O-KS, R-KS1 or R-KS2 as soon as this message MM has been delivered to the recipient. In order to ensure additionally that the sender is notified as soon as the recipient reads this message MM, the sender requests a read confirmation ("X-MMS-Read-Reply: Yes"). Since the sender does not wish to remain anonymous in relation to the recipient, the sender allows visibility of the sender's address ("X-MMS-Sender-Visibility: Yes"). So that this message MM can be understood more quickly, the sender also specifies a subject line for the message ("Subject: Photo of lab layout").

Assuming the sender knows that the recipient is (currently) only or most rapidly available via fax, the sender can specify the communication means for the forwarding/dispatch of this message MM in accordance with the second and third (see below) embodiment, by setting the value of "X-Mms-communication-means:" to "Facsimile".

Further possible values for "X-Mms-communication-means:" are:

"MM": so that a message MM is not converted if possible, but is sent as MM;
"E-mail": so that the message MM is converted into an Internet e-mail and sent as such;
"Facsimile": so that the message MM is converted into a fax message and sent as such;

"SMS": so that the message MM is converted into an SMS short message and sent as such; and "Voice mail": so that the message MM or text content of the message MM is converted into a voice message and sent as such.

The information elements of the header can either be encoded as text (e.g. ASCII) or as binary, for example. In this way, the following binary encoding can be used for the additional information element:

The name of the header field or header information element "X-Mms-communication-means:" is encoded and specified in binary as "0x1B", for example.

The values that the header field "X-Mms-communication-means:" can accept are encoded and specified, for example, as follows:

X-Mms-communication-means: Communication-Means-Value=MM,

E-mail, facsimile, SMS or voice mail, with the following values:

| | |
|---|---|
| MM = | <octet 128> |
| E-mail = | <octet 129> |
| Facsimile = | <octet 130> |
| SMS = | <octet 131> |
| Voice mail = | <octet 132> |

In the second example described in the preceding paragraphs, the message MM is therefore forwarded by the server O-RS to the subscriber device which is specified by the sender using the additional information element, if the server O-RS recognizes the subscriber device as not belonging to the local MMS communication system O-KS, as not belonging to the recipient-side MMS communication system R-KS1, or as not belonging to the recipient-side e-mail system R-ES. The path to be used for forwarding is therefore specified by the server O-RS as having a higher priority, while the parameter specified by the sender is a "soft" condition that is attributed a lower priority by the server O-RS.

In a third example, this priority setting is reversed or canceled. In this case, the forwarding of the message MM to the type of subscriber device specified by the sender is initially obligatory for the server O-RS. The specification of the recipient-side subscriber device in this context takes place in accordance with the specification of the second example (see Table 1, etc.).

Where the priority sequence is reversed, the server O-RS must first attempt to forward the message to the specified subscriber device, the conversion described above being effected as fully as possible in the case of a subscriber device which is not MMS-enabled. If the server O-RS cannot contact the specified subscriber device or transmit the message to said device, the server O-RS attempts with low priority to transmit the message MM to a subscriber device which is known to the server O-RS and belongs to the recipient.

Alternatively in the third example, only the parameter specified by the sender is taken into consideration as a sole priority. If it is not possible to reach or to transmit the message MM to the subscriber device specified by the sender, the sender merely receives a negative forwarding confirmation (see below).

In both the second and third examples, a validation check can be carried out in order to ascertain whether a forwarding attempt to a specific type of recipient-side subscriber device has already been executed in a previous step. In this case, the forwarding on this communication path or to this type of subscriber device is not attempted again. If an attempt to forward to a fax device as a subscriber device has already failed in the above cases, for example, this form of forwarding need not be checked again in the subsequent steps. The server O-RS can achieve this by, for example, setting and deleting markers for the various types of subscriber device.

Figure 2:
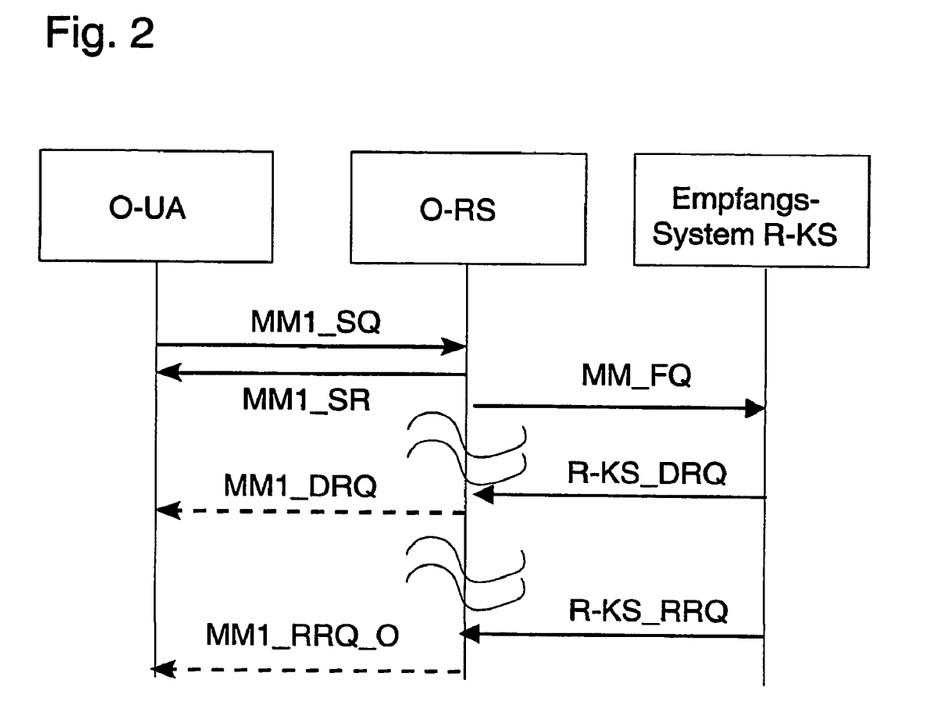
FIG. 2 illustrates various possibilities for the receipt acknowledgment of a received or forwarded message.

FIG. 2 shows the confirmation of the receipt and/or the forwarding of an MMS message MM by the server O-RS and/or the confirmation of the receipt of the (partly converted) message by a subscriber device (O-UA, R-UA, R-ES, FAX, telephone, SMS application, etc.) and/or the attention of the recipient. The optional parameters specified by the sender, as per the selected information elements in Table 1, determine which of the various confirmation levels has to be delivered by the sender-side communication system or recipient-side communication system respectively.

The confirmation illustrated here is applicable for all three disclosed examples, only the confirmation of the MMS or e-mail transmission path being possible in the first example.

The arrow MM1_SQ in FIG. 2 signifies the sending of a message MM from the sender O-UA to the server O-RS. MM1_SR is the confirmation of the receipt of the message MM by the server O-RS. MM_FQ is the confirmation of the forwarding/dispatch of the message MM as an MMS message or converted, for example, into an Internet e-mail, a fax or an SMS. MM_FQ is the forwarding of a (converted) message to the recipient-side communication system R-KS1, R-KS2.

R-KS_DRQ is the confirmation of the receipt of the message by the recipient-side communication system R-KS1, R-KS2. In this case, the confirmation can take place either by means of a server (e.g., R-RS) or by means of the subscriber device itself (e.g., in the case of fax). The confirmation is analyzed by the server O-RS (it might be necessary to contact another subscriber device if no confirmation is received—see above) and possibly forwarded to the sender O-UA.

R-KS_RRQ is the receipt confirmation of the recipient, confirming that the recipient has read or taken note of the message. R-KS_RRQ is forwarded by the recipient-side subscriber device, possibly via a server (R-RS) to the sender-side server O-RS and then to the sender O-UA. Depending on the type of the subscriber device, R-KS_RRQ and R-KS_DRQ can coincide (e.g., in the case of fax) or might not be supported by the subscriber device.

With reference to the references cited above in the background, Table 2 shows which information items can be combined to form such a confirmation. In addition to the known information items, the sender-side server O-RS adds the selection, as made by the sender and/or by the server O-RS, of the communication system O-KS, R-KS1, R-KS2 or of the communication path for the forwarding of the message MM, as a confirmation element. This confirmation element is illustrated in bold and italics in Table 2 (shown later).

Because the server RS specifies the message transfer system that is actually used, the sender does not just receive a yes/no acknowledgment to indicate whether the sender's message MM including the specified transmission path was accepted, but also receives the information indicating which recipient-side subscriber device was actually used instead of the requested subscriber device in the event of a rejection.

In a WAP implementation of the MMS service, an exemplary confirmation of the sending of an MM in text encoding can therefore appear as follows:

| | |
|---|---|
| X-Mms-Message-Type: | m-send-conf |
| X-Mms-Transaction-ID: | 123456789 |
| X-Mms-Version: | 1.0 |
| X-Mms-Message-ID: | user-xxxxxx-123456789 |
| X-Mms-communication-means: | Facsimile |

In the above example, "X-Mms-Message-Type: m-send-conf" specifies that this message is a confirmation sent from a sender-side server RS to a sender, concerning the sending of a message which contains the same transaction identification code "X-Mms-Transaction-ID: 123456789". This transaction identification code is used so that it is possible in the subscriber device O-UA for the confirmation of sending to be mapped onto the original sending of the MM (see below); that is, so that it is possible to provide the original sending subscriber device with a confirmation for the original message MM. In this case, the sender-side server RS allocates a message identity to the message MM ("X-Mms-Message-ID: user-xxxxxx-123456789"), which message identity is used, for example, for tracing receipt and/or read confirmations/reports.

The version number "X-Mms-Version: 1.0" is required for purposes of backward compatibility.

If the sender specified a communication means for the forwarding/dispatch of the message MM, this selection is acknowledged by the sender-side server O-RS, in that the server O-RS sets the value of "X-Mms-communica the medium that is actually selected. In this case, the server O-RS has set the value to "Facsimile" and therefore confirmed to the subscriber O-UA that the message MM was sent as a fax to the recipient as requested.

The service feature whereby the sender (O-UA) specifies the recipient-side subscriber device is implemented, for example, by transferring an additional header field "X-Mms-communication-means:" in the WAP message M-Send.req. The service feature whereby the confirmation type is designated is implemented, for example, by transferring an additional header field "X-Mms-communication-means:" in the WAP message M-Send.conf.

If the transmission of a receipt confirmation is provided for and practicable at the recipient-side communication system (e.g., R-KS2), the server O-RS requests this in the communication format of the recipient-side communication system R-KS2. After the server O-RS has received the confirmation in recipient-side communication system R-KS2, it converts this confirmation and forwards it onward to the sending subscriber device O-UA.

As an alternative to the above example of the WAP implementation of the MMS service, an exemplary sending of a (identical) message MM in text encoding can appear as follows:

X-Mms-Message-Type: m-send-reg
X-Mms-Transaction-ID: 123456789
X-Mms-Version: 1.0
To: +495341xxxxxx/TYPE=Facsimile
From: josef.xxxxxx@mms-xxxxxx.de
X-MMS-Message-Class: Personal
Date: Fri, 07 Feb. 2001 09:58:19+0100
X-MMS-Expiry: Fri, 07 Feb. 2001 12:00:00+0100
X-MMS-Delivery-Time: Fri, 07 Feb. 2001 11:00:00+0100
X-Mms-Priority: High
X-MMS-Read-Reply: Yes
X-MMS-Delivery-Report: Yes
X-MMS-Sender-Visibility: Yes
Subject: Photo of lab layout
Content-Type: text/plain;
Hi Marcus
Please send me the picture of our laboratory layout as soon as possible!
Regards
Josef XXXXXX In this example, the selection of the communication means of the recipient takes place alternatively by extending the recipient address: "To: +495341xxxxxx/TYPE=Facsimile". The advantage of this example is that, if an MM has a plurality of recipients, the communication means can be selected separately for each recipient. However, this variant has a disadvantage in that, unless a field is added for "X-Mms-communication-means:", at least in the receipt confirmation to the sender, it is not possible to report the communication means which was actually selected.

In the case of recipients or recipient-side subscriber devices which neither belong to the sender-side MMS system nor can be allocated to a second MMS system which is known to the sender-side MMS system, no rules have been specified in respect of how, and to what type of system, the sent MMS (multimedia message service) should be forwarded in order to ensure that it reaches the recipient.

As shown by the method discussed above, an MMS message from a first subscriber device can be forwarded from an MMS-enabled system to a second subscriber device, even if the second subscriber device is not linked into an MMS-enabled system. This applies if, for example, either the second subscriber device and/or the message transfer system or communication system into which the second subscriber device is linked does not work in accordance with the MMS standard.

For this purpose, the MMS message is converted into the message format of the recipient-side communication system if the second subscriber device is linked into a system that is not MMS-enabled. In order to ensure maximum utilization of the information, including both the content and accompanying information elements of the MMS message, the conversion takes place in accordance with a message transfer format that can be used by the subscriber device and works in accordance with the recipient-side communication system.

In a described configuration, the sender of the MMS message (user of the first subscriber device) can specify the message transfer format in which the MMS message is to be forwarded. A user of an MMS system can therefore specify for the recipient of a multimedia message the communication means via which the message is to reach the recipient. In this context, the specification of the message transfer format is synonymous with the specification of the type of the receiving subscriber device (fax, telephone, SMS, etc.) or the communication path to the subscriber device (telephone fixed network, Internet e-mail, etc.).

The specification or designation is effected using a conventional, but modified information element, or an additional information element, by means of which the sender of a multimedia message can specify at the time of sending said message the message transfer system that is to be used by the sender-side MMS system for forwarding the multimedia message to the recipient. The information element may be a header field of an MMS message or an extension to the address header field.

Conversion is carried out by an interface device of the sender-side communication system. Only one central device, which carries out the conversion according to the standards of other communication systems, is therefore required for each MMS communication system. The disclosed method is, therefore, economical and fast. In this case, an interface device is generally a server device, a switching device, or similar device, that manages a multiplicity of system-associated subscriber devices and handles their message transfer within the sender-side or recipient-side system.

For the conversion of the MMS message, it is desirable that the information elements of the MMS message are mapped onto information elements that are identical or similar, wherever possible, for the recipient-side communication system. Information elements are, for example, command instructions, control functions or similar, which contain information about the recipient, the sender, the type of transfer, the time of transfer, security aspects, confirmation processes or similar. If such a conversion cannot take place, or if additional information must be provided for the system-external recipient (subscriber device), this information can be converted advantageously into text elements, graphics elements, audio elements or similar, which the recipient then receives in the recipient's message format.

The optional selection of various levels of receipt confirmation allows the sender to check that the message has been reliably received or forwarded.

In another configuration disclosed above, the data format (type of receiving subscriber device or communication path) specified by the sending subscriber device is also taken into consideration. This consideration can then assume a high or low priority in the processing sequence.

If the MMS message has to be forwarded from the recipient-side subscriber device to a plurality of recipients, e.g., as a serial letter or copy, all the designated subscriber devices (recipients) are either processed consecutively in each priority level when the priority sequence is requested, or each recipient is processed individually in accordance with the priority levels.

Although preferred examples have been disclosed for illustrative purposes, those of ordinary skill in the art will appreciate that the scope of this patent is not limited thereto. On the contrary, this patent covers all methods and apparatus falling within the scope of the appended claims.

TABLE 1

Information elements of a header of an MMS message MM when sending from a subscriber device O-UA to a sender-side server RS.

| Description of the information element - with reference to [1] | Implementation as control fields - with reference to [2] | Inclusion |
| --- | --- | --- |
| Message type | "X-Mms-Message-Type:" | Mandatory |
| Transaction identification code | "X-Mms-Transaction-ID:" | Mandatory |
| Version number | "X-Mms-Version:" | Mandatory |
| Recipient address(es) | "To:"/"CC:"/"Bcc:" | Mandatory |
| Sender address | "From:" | Optional |
| Message class of the MM | "X-MMS-Message-Class:" | Optional |
| Time stamp (date and time) when the MM was sent | "Date:" | Optional |
| Period of validity: expiry time for the MM | "X-MMS-Expiry:" | Optional |
| Period of validity: earliest time for forwarding the MM | "X-MMS-Delivery-Time:" | Optional |
| Priority of the MM | "X-Mms-Priority:" | Optional |
| Request for a delivery confirmation for the MM | "X-MMS-Delivery-Report:" | Optional |
| Request for a read confirmation for the MM | "X-MMS-Read-Reply:" | Optional |
| Visibility to the recipient of the sender's address (request for sender anonymity) | "X-MMS-Sender-Visibility:" | Optional |
| Title/subject of the MM | "Subject:" | Optional |
| Request for the selection of a communication means (e.g. Internet e-mail, fax, SMS) for forwarding the MM | "X-Mms-communication-means:" | Optional |
| Content type of the MM | "Content-Type:" | Mandatory |

TABLE 2

Information elements when confirming the sending/receipt of a message MM by a sender-side server O-RS.

| Description of the information element - with reference to [1] | Implementation as control fields - with reference to [2] | Inclusion |
| --- | --- | --- |
| Status of the send | "X-MMS-Response-Status:" | Mandatory |
| Additional text to describe the status of the send | "X-MMS-Response-Text:" | Optional |
| Message identity | "X-Mms-Message-ID:" | Mandatory |
| Status of the request for the selection of a communication means for forwarding the MM (e.g. Internet e-mail, fax, SMS) | "X-MMS-communication-means:" | Optional |

The invention claimed is:

1. A method for sending a MMS message from a first subscriber device in a MMS-enabled communication system to a second, non-MMS enabled subscriber device, comprising:

specifying, at the first subscriber device or at an interface of the MMS-enabled communication system, a message transfer format for the second subscriber device;

specifying, at the first subscriber device or at an interface of the MMS-enabled communication system, a message transfer format that works in accordance with its recipient-side communication system for said MMS message which is to be sent to the second subscriber device, wherein the message transfer format for said MMS message which is to be sent to the second subscriber device is specified by at least one of one or more information elements in the header of the MMS message or by an extension to an address header field of said MMS message;

converting the content and at least some of the information elements of this MMS message which is to be sent to the second subscriber device in accordance with said specified message transfer format by an interface device of the MMS-enabled system of the first subscriber device, if the second subscriber device is linked into a communication system that is not MMS-enabled or is not able to receive MMS messages, and forwarding said converted MMS message to the second subscriber device, if the second subscriber device is at least one of not linked into a MMS-enabled system or not able to receive MMS messages.

2. The method as claimed in claim 1, wherein the one or more information elements includes at least one of a recipient address and an additional information element of the MiMS message.

3. The method as claimed in claim 2, wherein the additional information element contains an information element name or header field name in binary encoding "Ox1B", in accordance with the WAP MMS encapsulation standard, and the following assignment of message formats takes place:

| | |
|---|---|
| MMS message (MM) = | <octet 128>, |
| E-mail = | <octet 129>, |
| Facsimile = | <octet 130>, |
| SMS = | <octet 131>, |
| Voice mail = | <octet 132>. |

4. The method as claimed in claim 1, wherein the interface device executes conversion of the MMS message from the first subscriber device.

5. The method as claimed in claim 1, wherein when the MMS message is converted, the MMS message is associated with a transfer protocol for the message transfer format that has been specified for the MMS message to be sent to the second subscriber device.

6. The method as claimed in claim 5, wherein the transfer protocol is generated from the information elements of the MMS message.

7. The method as claimed in claim 6, wherein at least some of the information elements of the MIMS message to be sent to the second subscriber device are converted into control information items that can be analyzed by a communication system of the second subscriber device.

8. The method as claimed in claim 7, further comprising:
converting at least some information elements of the MIMS message; and adding the converted information elements to the content of the MMS message for the second subscriber device, the converted information elements comprising information elements that cannot be converted into the control information elements that can be analyzed by the communication system of the second subscriber device.

9. The method as claimed in claim 1, further comprising:
transferring a confirmation report from an interface device of the MMS-enabled communication system to the first subscriber device, the confirmation report relating to at least one of receipt of the MMS message by said interface device or relating to forwarding of the MMS message to the second subscriber device.

10. The method as claimed in claim 9, wherein the confirmation report includes at least one of a designation of the message transfer format, a type of the second subscriber device, or a confirmation of the forwarding using a message transfer format which was specified by the first subscriber device.

11. The method as claimed in claim 1, further comprising:
executing at the interface device at least the following one of depending on a condition result;

checking whether the second subscriber device belongs to the MMS-enabled communication system and forwarding the MMS message to the second subscriber device in the MMS-enabled communication system when the second subscriber belongs to the system;

checking whether the second subscriber device belongs to another at least one other MMS-enabled system, and forwarding the MMS message to the second subscriber device when the second subscriber device belongs to the at least one other system.

12. The method as claimed in claim 11, further comprising:

not forwarding the MMS message, and informing the first subscriber device accordingly when the second subscriber does not belong to the MMS-enabled communication system or the at least one other MMS-enabled communication system.

13. The method as claimed in claim 11 further comprising:

specifying at the first subscriber device a message transfer format of the second subscriber device, the message transfer format including formats for MMS, e-mail, facsimile and SMS; and forwarding the MMS message or the message which has been converted into the specified message transfer format, to the second subscriber device.

14. The method as claimed in claim 11, further comprising:

specifying at the first subscriber device a message transfer format of the second subscriber device, the message transfer format including in particular message transfer formats for MMS, e-mail, facsimile and SMS; and forwarding the MMS message, or the MMS message after it has been converted into the specified message transfer format to the second subscriber device that has been specified by the first subscriber device prior to checking executed by the interface device.

15. The method as claimed in claim 11, wherein the method is executed either in parallel or consecutively for each subscriber device that is to receive the MMS message from the first subscriber device.

16. The method as claimed in claim 11 further comprising:
forwarding the MMS message to the second subscriber device, wherein the second subscriber device has been specified by the first subscriber device or the interface device, when forwarding the MMS message has not been previously unsuccessfully attempted.

17. The method according to claim 1, wherein at least some of the information elements of said MMS message to be sent to the second subscriber device are mapped onto information elements that are substantially identical for the recipient-side communication system of the second subscriber device.

18. The method according to claim 1, wherein the MMS message includes at least one of an e-mail, a fax, a SMS, a text file, a graphics file, an audio file and a video file.

19. A subscriber device for an MMS-enabled communication system for sending a MMS message to at least one other subscriber device that is not linked to an MMS-enabled communication system or not able to receive MMS messages, comprising:
an interface device for the MMS-enabled system of the subscriber device;
a control device for specifying, at the subscriber device, a message transfer format for the other subscriber device, and for specifying a message transfer format that works in accordance with its recipient-side communication system for said MMS message which is to be sent to the other subscriber device, wherein the message transfer format for said MMS message is specified by at least one of one or more information elements in the header of the MMS message or by an extension to an address header field of said MMS message;
wherein the control device converts the content and at least some of the information elements of the MMS message to be sent to the other subscriber device in accordance with said specified message transfer format by the interface device if the other subscriber device is linked into a communication system that is not MMS-enabled or is not able to receive MMS messages, and
means for forwarding said converted MMS message to the other subscriber device, if the other subscriber device is at least one of not linked into a MMS-enabled system or not able to receive MMS messages.

20. An interface device for use in a communication system for forwarding an MMS message from a first subscriber device operable in an MMS-enabled communication system to a second subscriber device that is not linked to an MMS-enabled communication system or not able to receive MMS messages, comprising:
a control device for specifying, at the first subscriber device, a message transfer format for the second subscriber device, and for specifying a message transfer format that works in accordance with its recipient-side communication system for said MMS message which is to be sent to the second subscriber device, wherein the message transfer format for said MMS message is specified by at least one of one or more information elements in the header of the MMS message or by an extension to an address header field of said MMS message;
wherein the control device converts the content and at least some of the information elements of the MIMS message to be sent to the second subscriber device in accordance with said specified message transfer format by the interface device if the second subscriber device is linked into a communication system that is not MMS-enabled or is not able to receive MMS messages, and
means for forwarding said converted MMS message to the second subscriber device, if the second subscriber device is at least one of not linked into a MMS-enabled system or not able to receive MMS messages.

* * * * *